United States Patent
Hillard et al.

(10) Patent No.: US 9,916,301 B2
(45) Date of Patent: Mar. 13, 2018

(54) NAMED ENTITY VARIATIONS FOR MULTIMODAL UNDERSTANDING SYSTEMS

(71) Applicant: Microsoft Technology Licensing, LLC, Redmond, WA (US)

(72) Inventors: Dustin Hillard, Seattle, WA (US); Fethiye Asli Celikyilmaz, Mountain View, CA (US); Dilek Hakkani-Tur, Los Altos, CA (US); Rukmini Iyer, Los Altos, CA (US); Gokhan Tur, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

(21) Appl. No.: 13/725,614

(22) Filed: Dec. 21, 2012

(65) Prior Publication Data
US 2014/0180676 A1    Jun. 26, 2014

(51) Int. Cl.
| | | |
|---|---|---|
| G06F 17/30 | (2006.01) |
| G06F 7/00 | (2006.01) |
| G06Q 30/00 | (2012.01) |
| G10L 15/00 | (2013.01) |
| H04M 3/00 | (2006.01) |
| G06F 17/27 | (2006.01) |

(52) U.S. Cl.
CPC .................................. G06F 17/278 (2013.01)

(58) Field of Classification Search
CPC .. G06F 17/274; G06F 17/277; G06F 17/2785; G06F 17/271; G06F 17/2715; G06F 17/289; G06F 17/2872; G06F 17/2827; G06F 17/2836; G06F 17/2818

USPC .............................................................. 704/9
See application file for complete search history.

(56) References Cited

U.S. PATENT DOCUMENTS

| | | | | |
|---|---|---|---|---|
| 6,006,222 A | * | 12/1999 | Culliss | G06F 17/30864 |
| 6,269,153 B1 | * | 7/2001 | Carpenter | H04M 1/645 379/88.02 |
| 6,285,999 B1 | * | 9/2001 | Page | G06F 17/30728 |
| 6,816,858 B1 | * | 11/2004 | Coden et al. | 707/750 |
| 6,850,988 B1 | * | 2/2005 | Reed | G06Q 10/06 707/999.003 |
| 7,281,042 B2 | * | 10/2007 | Hsu | G06F 17/30864 707/E17.108 |
| 7,447,688 B2 | * | 11/2008 | Dietz | G06F 17/30867 |
| 7,640,233 B2 | * | 12/2009 | Baartman | G06Q 10/107 |

(Continued)

*Primary Examiner* — Fariba Sirjani (57) ABSTRACT

Click logs are automatically mined to assist in discovering candidate variations for named entities. The named entities may be obtained from one or more sources and include an initial list of named entities. A search may be performed within one or more search engines to determine common phrases that are used to identify the named entity in addition to the named entity initially included in the named entity list. Click logs associated with results of past searches are automatically mined to discover what phrases determined from the searches are candidate variations for the named entity. The candidate variations are scored to assist in determining the variations to include within an understanding model. The variations may also be used when delivering responses and displayed output in the SLU system. For example, instead of using the listed named entity, a popular and/or shortened name may be used by the system.

20 Claims, 8 Drawing Sheets

(56) References Cited

U.S. PATENT DOCUMENTS

| | | | | |
|---|---|---|---|---|
| 7,725,463 | B2* | 5/2010 | Hurst-Hiller | G06F 17/30646 707/723 |
| 7,890,521 | B1* | 2/2011 | Grushetskyy | G06F 17/30867 704/10 |
| 7,925,610 | B2* | 4/2011 | Elbaz et al. | 706/55 |
| 7,974,885 | B1* | 7/2011 | Bowman | G06F 17/30646 705/26.1 |
| 8,112,403 | B2* | 2/2012 | Repasi | G06F 17/30864 705/26.7 |
| 8,209,331 | B1* | 6/2012 | Garg | G06F 17/30067 707/734 |
| 8,265,925 | B2* | 9/2012 | Aarskog | G06F 17/271 704/1 |
| 8,346,791 | B1* | 1/2013 | Shukla | G06F 17/30864 707/759 |
| 8,412,514 | B1* | 4/2013 | Feng | G06F 17/2211 704/1 |
| 8,527,507 | B2* | 9/2013 | Shnitko | G06F 17/30675 707/723 |
| 8,738,643 | B1* | 5/2014 | Czuba | G06F 17/2235 707/730 |
| 8,935,269 | B2* | 1/2015 | Messer | G06F 17/30646 707/758 |
| 9,116,918 | B1* | 8/2015 | Kim | G06F 17/30241 |
| 9,178,848 | B1* | 11/2015 | Li | H04L 61/30 |
| 9,223,897 | B1* | 12/2015 | Gross | G06F 17/30941 |
| 9,317,563 | B1* | 4/2016 | Horling | G06F 17/3053 |
| 2001/0053968 | A1* | 12/2001 | Galitsky | G06F 17/30722 704/9 |
| 2002/0198859 | A1* | 12/2002 | Singer | G06F 17/30893 |
| 2003/0191625 | A1* | 10/2003 | Gorin et al. | 704/1 |
| 2004/0111264 | A1* | 6/2004 | Wang | G06F 17/278 704/257 |
| 2004/0243407 | A1* | 12/2004 | Yu et al. | 704/240 |
| 2007/0276829 | A1* | 11/2007 | Wang | G06F 17/30663 |
| 2009/0083028 | A1* | 3/2009 | Davtchev | G06F 17/273 704/9 |
| 2009/0204596 | A1* | 8/2009 | Brun et al. | 707/5 |
| 2009/0265338 | A1* | 10/2009 | Kraft | G06F 17/30864 |
| 2009/0319500 | A1* | 12/2009 | Agrawal et al. | 707/4 |
| 2010/0042460 | A1* | 2/2010 | Kane, Jr. | G06Q 30/02 705/14.69 |
| 2010/0104086 | A1* | 4/2010 | Park | 379/265.09 |
| 2010/0138452 | A1* | 6/2010 | Henkin | G06Q 30/0256 707/803 |
| 2010/0217781 | A1* | 8/2010 | Benhadda et al. | 707/803 |
| 2010/0293179 | A1* | 11/2010 | Chaudhuri et al. | 707/759 |
| 2011/0161260 | A1* | 6/2011 | Burges | G06F 17/30887 706/12 |
| 2011/0178851 | A1* | 7/2011 | Tseng | G06Q 10/0639 705/7.38 |
| 2011/0231347 | A1* | 9/2011 | Xu | G06F 17/30864 706/12 |
| 2011/0258049 | A1* | 10/2011 | Ramer | G06F 17/30867 705/14.66 |
| 2011/0289068 | A1* | 11/2011 | Teevan | G06F 17/30867 707/709 |
| 2012/0030152 | A1* | 2/2012 | Pueyo | G06F 17/30867 706/12 |
| 2012/0150838 | A1* | 6/2012 | Yin et al. | 707/711 |
| 2012/0158685 | A1* | 6/2012 | White | G06F 17/30867 707/706 |
| 2012/0259801 | A1* | 10/2012 | Ji et al. | 706/12 |
| 2012/0317088 | A1* | 12/2012 | Pantel et al. | 707/706 |
| 2013/0080152 | A1* | 3/2013 | Brun et al. | 704/9 |
| 2013/0332438 | A1* | 12/2013 | Li et al. | 707/706 |
| 2014/0236570 | A1* | 8/2014 | Heck | G06F 17/30654 704/9 |
| 2015/0332670 | A1* | 11/2015 | Akbacak | G10L 15/063 704/9 |
| 2017/0068903 | A1* | 3/2017 | Hakkani-Tur | G06N 99/005 |

* cited by examiner

NAMED ENTITY VARIATIONS FOR MULTIMODAL UNDERSTANDING SYSTEMS

BACKGROUND

Spoken Language Understanding (SLU) systems may be used in a variety of different applications. A SLU system may be created to identify a particular entry in a list (e.g. person, movie, item, product, song, . . . ) based on a spoken utterance. For example, a particular list entry may be identified by its name. Training these SLU systems to use variations of a name can be very challenging. For example, determining the variations of an entry in the list can be very time consuming.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Click logs are automatically mined to assist in discovering candidate variations for named entities. The named entities may be obtained from one or more sources (e.g. databases, web sites, documents, . . . ) and include an initial list of named entities (e.g. person, movie, item, product, song, and the like). A search may be performed within one or more search engines to determine candidate phrases that are used to identify the named entity (e.g. "word" for MICROSOFT WORD, "sting" for the musician Gordon Sumner, "harry potter 2" or "chamber of secrets" for the movie Harry Potter and the Chamber of Secrets, and the like) in addition to the named entity initially included in the named entity list. Click logs associated with results of past searches are automatically mined to discover what phrases determined from the searches are popular/candidate variations for the named entity. The determined candidate variations are scored to assist in determining the variations to include within an understanding model (e.g. a Spoken Language Understanding (SLU) model) that are used to identify the named entities. The variations may also be used when delivering responses and displayed output in the SLU system. For example, instead of using the listed named entity, a popular and/or shortened name (e.g. "SNL" for "Saturday Night Live") may be used by the SLU system.

DETAILED DESCRIPTION

Referring now to the drawings, in which like numerals represent like elements, various embodiment will be described.

Figure 1:
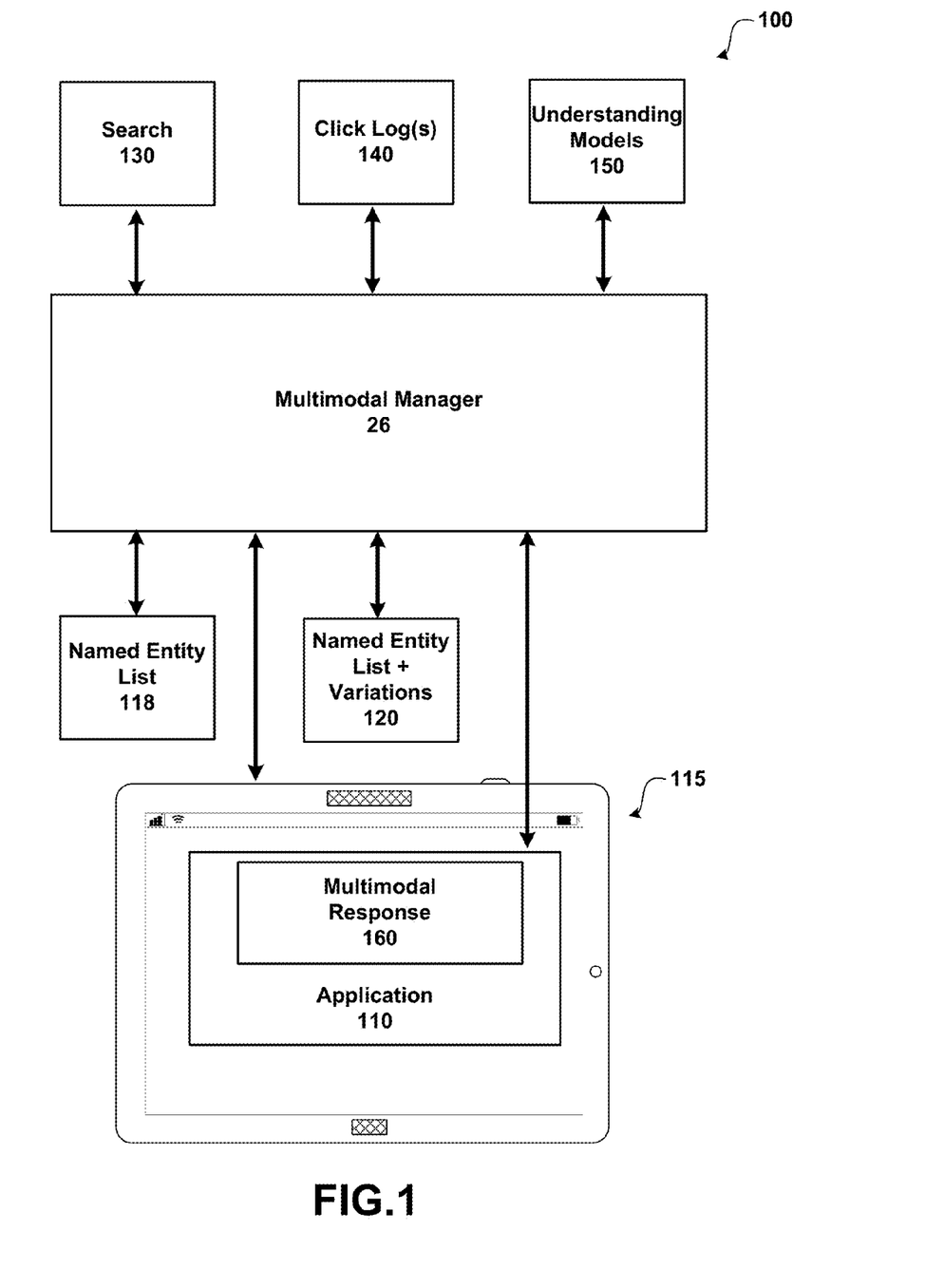
FIG. 1 shows a system for determining and using variations to named entities in a multimodal system.

FIG. 1 shows a system for determining and using variations to named entities in a multimodal system. As illustrated, system 100 includes multimodal manager 26, named entity list 118, name entity list+variations 120, search 130, click log(s) 140, understanding model(s) 150, multimodal response 160, application 110 and touch screen input device/display 115.

In order to facilitate communication with the multimodal manager 26, one or more callback routines, may be implemented. According to one embodiment, application program 110 is a multimodal application that is configured to receive speech input and input from a touch-sensitive input device 115 and/or other input devices. For example, voice input, keyboard input (e.g. a physical keyboard and/or SIP), video based input, and the like. Application program 110 may also provide multimodal output (e.g. speech, graphics, vibrations, sounds, . . . ). Multimodal manager 26 may provide information to/from application 110 in response to a user's input (e.g. speech/gesture). For example, a user may say a phrase to identify a named entity that is used by application 110 (e.g. selecting a movie, identifying a product, . . . ). Gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like.

System 100 as illustrated comprises a touch screen input device/display 115 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Multimodal manager 26 is configured to automatically determine variations to named entities and to use the determined variations in an understanding model, such as a language understanding model/spoken parsing model for multimodal system 100. Multimodal manager 26 mines click log(s) (e.g. web click data) 140 to assist in discovering popular variations for named entities. The named entities may be obtained from one or more sources (e.g. databases, web sites, documents, . . . ) and include an initial list 118 of named entities (e.g. person, movie, item, product, song, and the like). According to an embodiment, list 118 contains a single canonical phrase for each named entity. According to another embodiment, list 118 may include one or more canonical phrase for each named entity. Entries in a named entity list may be known by more than one phrase. For example, a plant may be referenced by its scientific name as well as more user friendly name.

Multimodal manager 26 may perform a search using one or more search engines to determine common phrases that are used to identify one or more of the named entities (e.g. "word" for MICROSOFT WORD, "sting" for the musician Gordon Sumner, "harry potter 2" or "chamber of secrets" for the movie Harry Potter and the Chamber of Secrets, and the like). For example, multimodal manager 26 may perform a search on all/portion of the named entities in named entity list 118 to determine more candidate variations than obtained from click log(s) 140. Multimodal manager 26 may perform a search on named entities in named entity list 118 that do not have clicks associated with them and/or that have limited clicks associated with them. Click logs 140 are logs that record user clicks that are associated with results of past searches. Multimodal manager 26 automatically mines the click logs 140 to discover what phrases are popular variations for the named entity.

Multimodal manager 26 scores the determined variations to assist in determining the candidate variations to include within an understanding model (e.g. a Spoken Language Understanding (SLU) model and/or multimodal understanding model 150) that are used to identify the named entities. For example, a determined variation may not be included if the variation is determined to be an ambiguous phrase based on the score (e.g. not likely or below a defined threshold to correctly identify the named entity). The variations passing the threshold may be stored within list 120 that includes the named entities and each determined variation. Multimodal manager 20 incorporates the variations into understanding model(s) 150 and are used when receiving input and delivering responses (e.g. spoken/non spoken) as well as displayed output in the SLU system. For example, instead of using the listed named entity, a popular and/or shortened name (e.g. "SNL" for "Saturday Night Live") may be used by the multimodal system 100. More details are provided below.

Figure 2:
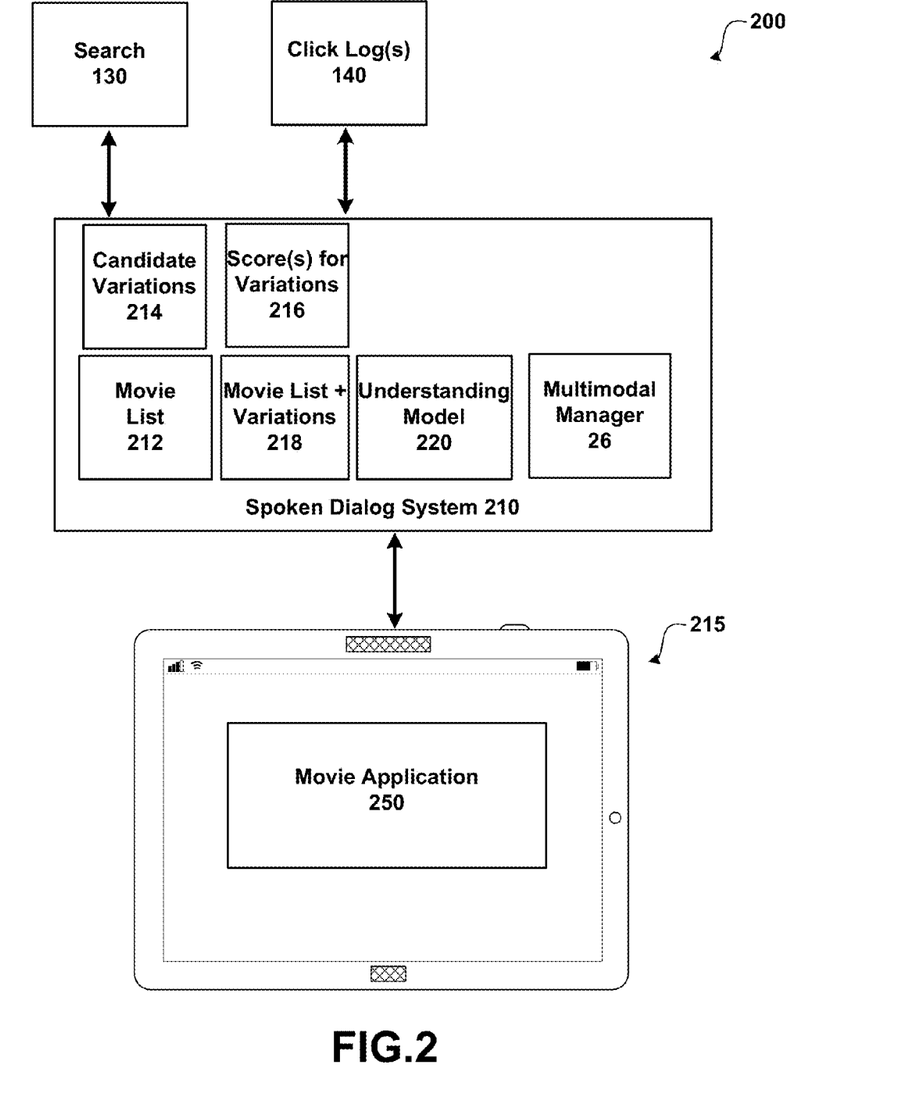
FIG. 2 illustrates an example of determining variations for a list of named entities comprising movie titles.

FIG. 2 illustrates an example of determining variations for a list of named entities comprising movie titles.

While a movies example for determining named entity variations is described, the following example is provided for illustration purposes. The named entity variation determination methods described may be applied to other entities across various domains.

An example task where a user interacts with a spoken dialog system 200 to select a movie to watch is described. Most movies have a single original title and are stored in a movie list 212. Many people, however, refer to a movies using different phrases/approximations. While different lists of movie names may be obtained from the Internet (e.g. from freebase.com), incorporating these lists into statistical classifiers can be challenging. These premade lists often contain noisy and ambiguous entries. For example, the freebase website provides a list of about 150 k movie names, but these include rare and ambiguous movie titles that can contribute noisy signals while training a classifier (such as movies titled "chrome" or "holiday inn"). These lists also lack many of the alternative forms for the entities which occur in common speech. While a movie's official title may be included in a list or some other source (e.g. Internet), popular variations on the movie's name are typically missing (e.g. "harry potter 2" or "chamber of secrets" for the movie officially titled "harry potter and the chamber of secrets"). These same difficulties are present for a wide spectrum of spoken named entities, such as people names, company names, locations, product names, plant names, and the like.

Given a noisy seed list of entities, web logs and search results are automatically mined by multimodal manager 26 to determine candidate variations 214 to include in an understanding model 229. Multimodal manager 26 scores each candidate entity 216 based on the click behavior of web search users (e.g. using click log(s) 140).

Statistical sequence models, such as Conditional Random Fields (CRFs), incorporate contextual features while also modeling the label sequence. Entity dictionaries, also called gazetteers, typically provide features to these sequence models that impact task performance Efforts to build high quality gazetteers can be grouped into two broad categories: document and corpus based mining, or web search log mining.

Document and corpus based mining approaches may be used in developing initial entity lists, and may also provide approaches for developing variations. Entity lists (e.g. movie list 212) can be extracted from structured databases and/or other sources. System 200 is configured to generate variations (e.g. using search 130) for seed entities in a gazetteer that may never have occurred as a web query. For example, seed entities may have no clicks. The following description separates the problem of ranking variations for a seed entity in a given gazetteer and the problem of scoring an entry for ambiguity.

There are many resources (e.g. on the web) that provide typed entity lists, such as for movies or restaurants. These lists can be used for many natural language processing tasks, but often contain ambiguity and noise. A typical approach is to spend significant human effort in cleaning entity lists before including them in statistical systems. Using just the raw list can even hurt system performance. While expert human cleaning is possible when creating a small number of entity dictionaries, the approach does not scale well for potentially hundreds of dictionaries with thousands of entities. Maintenance may also be difficult given the constantly changing nature of many lists, such as with new movie releases or emerging celebrities.

Click logs (e.g. click log(s) 140) from web search engines (e.g. MICROSOFT BING, GOOGLE, . . . ) implicitly encode information that multimodal manager 26 automatically extracts and processes to refine noisy entity lists, and/or filter mined entity variations. Users of web search engines (e.g. search 130 provide information about entities in the course of typical search sessions by clicking on relevant websites, and this is recorded in search engine logs.

Given a noisy set of typed entities, multimodal manager 26 generates a score for each entity in a set (e.g. each entity in candidate variations 214) that reflects the likelihood that the entity is a good member of the set. A high score indicates an entity that has an unambiguous membership in the set. A low score indicates that an entity has an ambiguous or incorrect membership. For example, the phrase "The Dark Knight" uniquely references a movie, but the phrase "Hotel" (a small movie from 2003) has meaning in many other contexts. Examining search click logs shows that three quarters of user clicks for the query "The Dark Knight" belong to three sites: Wikipedia, IMDB, and Warner Brothers. The query "Hotel", however, shows that user clicks are more evenly distributed (one quarter of the clicks go to one hotel website, followed by a broad distribution of clicks on other travel sites with negligible clicks on a movie related site).

Whether or not a phrase belongs in an entity set is evaluated by multimodal manager 26 considering the websites users click when searching for that phrase. The following equation is used by multimodal manager 26 and computes the probability of a click on a particular website ($url_i$) given a proposed set of queries. This measure aggregates the clicks received by a particular website for queries in the candidate set (querySeedSet), divided by clicks received for all websites in the context of the candidate set as illustrated in Equation 1 following:

$$p(url_i \mid querySeedSet) = \frac{\text{clicks}(url_i \mid querySeedSet)}{\Sigma_h \text{clicks}(url_j \mid querySeedSet)}$$

where clicks is the sum of the clicks that a particular website received over each of the queries in the seed query set.

Given a candidate set, sites that are more related than other sites can be automatically inferred by multimodal manager 26 from the user click logs 140 in this way. According to an embodiment, websites are simplified by multimodal manager 26 to the basic domain name from the URL. For example, to determine the top movie sites, the clicks for movie titles (e.g. from freebase) are analyzed resulting in a set of related sites (e.g. wikipedia.org, imdb.com, amazon.com, netflix.com). According to an embodiment, a predetermined number of domains is maintained (e.g. the top 10 k domains). Click logs (e.g. click logs 140) may be maintained for these domains. These click distributions are compared to the click distribution for a particular phrase to evaluate if the phrase is a good match to an overall set. A phrase that is a high quality match has a click distribution similar to the set as a whole. A low quality match has a click distribution similar to a click log of random queries. This behavior is represented with likelihood ratios comparing the probability of a click on a site in the context of the seed entity set versus the probability of a click on a site in the context of any random web search. For example, the likelihood ratio for a site ($url_i$) in the context of a seed set of movie names, against a background model of random queries, is computed in Equation 2 as follows:

$$movieRatio(url_i) = \frac{p(url_i \mid movieSeedSet)}{p(url_i \mid randomSeedSet)}$$

The log likelihood ratio is an alternative form, where movieLogRatio($url_i$)=log(movieRatio($url_i$)). For example, likelihood ratios using the above equation include netflix.com 93/4.5, imdb.com (32/3.5), wikipedia.com (4.3/1.5), yellowpages.com 0.02/-4).

Comparing clicks on a site in the context of a set against clicks on the site for a set of random queries illustrates the relationship of a particular site to a set of entities more so than just the raw click probabilities. For example, while netflix.com receives a smaller percentage of the overall clicks for the movie domain than wikipedia.com, it is clear from the ratios that a click on netflix.com is a stronger indicator that a search is related to movies when compared with a background distribution of random web queries. For each individual candidate phrase in a set, a score is generated based on the sites clicked on for that phrase. The score can be viewed as a weighted click vote over the sites clicked for a phrase, where $p(url_i|phrase)$ is the portion of clicks on a particular site in the context of a single phrase and movieRatio($url_i$) weights the site with the likelihood ratio that the site is a movies site (from Equation 2):

$$\text{diffRatio(phrase)} = \Sigma_i p(url_i|phrase) * movieRatio(url_i) \quad \text{(Equation 3)}.$$

When weighted by the logMovieRatio, the score may be interpreted as the difference of cross entropies, comparing the cross entropy of the phrase click distribution and the movie click distribution with the cross entropy of the phrase click distribution and the random query click distribution. For example, example diffRatios are: 20 for "grumpier old men", 9.3 for "the dark knight", while "hotel" is 0.25 and "chrome" is 0.11.

The score may be generated in an automated fashion by multimodal manager 26, given a seed entity set. When some labeled utterances are available, training a classifier may be used to increase the score. The classifier is trained with the set of candidate phrases extracted from a collection of utterances using the complete list of entities, where the classifier target is true or false (whether that instance of the phrase was labeled as an entity in that utterance by a human annotator).

As mentioned, entity lists (e.g. movie list 212) generally use a single canonical value for each entity. Many entities, however, are often referred to in various ways by users, especially in natural interactions with a system. In the case of movie titles, variations can stem from many different reasons. For example, the canonical entry may be very long (e.g. "Harry Potter and the Deathly Hallows: Part II" is often referred to simply as the "Deathly Hallows"). Sequels of movies may be shortened to the primary title in the sequel (e.g. "LOTR The Return of the King" is often referred to as "The Return of the King"). Words from the beginning or end of the movie title may be dropped. Foreign movies are often referred to by users by their English title of release or vice versa.

Variations can also stem from many other reasons including re-ordering of words in the title, use of popular short names, or additional descriptive words. Variations for named entities (in this case movie names) may be generated by multimodal 26 based on mining web search queries and associated click logs. According to an embodiment, click graphs are processed by multimodal manager 26 to extract related queries or query rewrites. The click graph extends to observed queries and URLs in the search logs as well as URLs in search logs generated from scraping the search engine directly. Features are generated for each movie title and its variation pair that are directed at improving the entity scoring model. For each entry sq in seed entity list querySeedSet (movie titles from Freebase for instance), popular variations $rq_i$ of the seed query are generated along with a score s(sq, $rq_i$) to rank the variations. According to an embodiment, the click logs 140 are organized into a bipartite click graph where a query q is linked to a URL where the edge is weighted by the number of clicks on the URL for the query q, clicks(q, URL). To discover variations for a seed query sq, the click graph is walked through the clicked URLs to the other queries $rq_i$ that also resulted in a click to the same set of URLs by multimodal manager 26. Using each of the URLs observed in the click logs may generate significant noise in the variations (especially if the URLs include generic URLs such as "yahoo.com" which receive clicks from a very diverse set of queries). According to an embodiment, to assist in mitigating this noise, the set of URLs is limited to those that have significant clicks for a seed query sq and/or a manually selected list of URLs to trusted sources (IMDB is a potential example of a trusted movie sources). The list of trusted URLs may also be automatically constructed by multimodal manager 26 based on the score per URL as defined in Equation 2. One potential score for ranking a variation $rq_i$ for a query sq is to use a collaborative filtering score:

$$p(rq_i|sq) = \Sigma_j p(url_j|sq) p(rq_i|url_j) \qquad \text{(Equation 4)}$$

where both component probabilities are generated using the clicks on the edges, $$p(rq_i|url_j) = \text{clicks}(rq_i, url_j)/\text{clicks}(url_j) \qquad \text{(Equation 5)}$$

and $$p(sq|url_j) = \text{clicks}(sq, url_j)/\text{clicks}(sq) \qquad \text{(Equation 6)}$$

In some instances, seed entities are not observed in search/click logs. This may occur for various reasons (e.g. the entity is an infrequent entity or because users do not refer to the entity using its canonical (potentially obscure) form). In these cases, click logs 140 do not provide a set of URLs to discover variations. To obtain variations for each entity in an entity set, the search engine 130 may be directly scraped with the seed entity as a query to generate search results for the entity and the corresponding set of URLs. The search results page provides a ranked list of URLs to use. The rank of the URL may be used as a proxy for a smoothed click count for the seed sq:

$$\text{clicks}(sq, url_j) = \log_N(N/(\text{rank}(url_j)+1)) \qquad \text{(Equation 7)}$$

Walking the bipartite (query,url) click graph may generate a large and noisy list of entity variations, not all of which are useful. The noise in the entities comes from different sources, such as: variations that come from infrequent or noisy clicks on a URL and variations including non-entity related context words.

Since variations are generated from search queries and query clicks on URLs, the query may contains words or phrases that are not directly attributable to an entity variation. For instance, a movie title "Lonesome Ghosts" results in variations "lonesome ghost toy" and "lonesome ghosts images", where the contextual words "toy" and "images" are extraneous to the movie name variation. In the absence of supervised data to model pruning of contextual terms, the frequent set of contextual prefix and suffix words are identified based on the movie titles that have been observed as a search query with contextual words. In the example of the movie title "Lonesome Ghosts", the word "images" has its contextual suffix count updated based on observing the variation "lonesome ghost images". The prefix and suffix lists are ranked based on their frequency counts and prefix and suffix removal rules are generated based on the frequent entries in these lists respectively. When a prefix/suffix word is observed at the beginning/end of a potential variation $rq_i$, and the word itself is not a part of the seed query, the word is truncated from the variation.

As mentioned, another source of noise in variations stems from variations generated from infrequent clicks on URLs. To assist in mitigating noisy variations arising from few clicks, the variations are ranked by multimodal manager 26 based on the score defined in Equation 4 and the top 10 variations for each seed entity are selected. More/less variations may be included. Variations may also be pruned manually and/or automatically by multimodal manager 26 from the list using a threshold on the number of clicks for the variation in the context of the seed query $Pj$ $\text{clicks}(rq_i, url_j)$, where j is over the URL set that is generated from sq. Each entity in this pruned set of variations is then scored for entry in the movie title gazetteer. The baseline set of features that are used for scoring seed queries sq in the list may be used.

According to an embodiment, the feature set is expanded with features derived from the click graph used to discover variations. Some additional features may include: variation score $p(rq_i|sq)$ as defined in Equation 4; score proportional to $p(sq, rq_i)$; number of seed queries this variation was generated for; number of clicks in the graph for the seed query $\Sigma_j$ clicks $(sq, url_j)$; clicks on the URLs used to discover the variation $rq_i$, $\Sigma_j$ clicks $(url_j, rq_i)$; number of unique URLs that are common between sq and $rq_i$; number of clicks on seed sq on URLs in common; number of clicks on variation $rq_i$ on URLs in common, and identity of the domains from the URLs in common. One or more of these additional features may be used in the model to score the variation for its entry into the entity lexicon. These lexicons are then provided as features to the sequential entity detection model.

Discriminative statistical models, namely CRFs, are used for modeling. More formally, slot filling is defined as a sequence classification problem to obtain the most probable slot sequence:

$\hat{Y} = \text{argmax } p(Y|X)$ where $X = x_1, \ldots, x_T$ is the input word sequence and $Y = y_1, \ldots, y_T$, $y_i \in C$ is the sequence of associated class labels, C. The basic model uses an word n-gram based linear chain CRF, imposing the first order Markov constraint on the model topology. Similar to maximum entropy models, the conditional probability, $p(Y|X)$ is defined as:

$$p(Y|X) = \frac{1}{Z(X)} \exp$$

$(\Sigma_k \lambda_k f_k(y_{t-1}, y_t, x_t))$ with the difference that both X and Y are sequences rather than individual local decision points. Weights $\lambda_k$ are learned for features functions $f_k$ (such as n-gram lexical features, state transition features, or others). $Z(X)$ is the sequence normalization term. After the transition and emission probabilities are optimized, the most probable state sequence, $\hat{Y}$, is decoded using the Viterbi algorithm. Gazetteer or lexicon entries may also incorporated in the same framework as additional features. While the gazetteer entries are marked without considering context according to an embodiment, they are provided to the CRF model, which can then decide on whether a token is a constituent of a potential slot. More formally, an extra set of features is created for each gazetteer: $f_{G,c}(y_{t-1}, y_t, x_t) = \delta(x_t \in G)\delta(y_t = c)$ where $\delta(x_t \in G)$ is for querying membership (B, I, or O) for that gazetteer, and c is the slot filling class. A score may also be associated with each gazetteer entry, which gives the ambiguity of the entry in the gazetteer. According to an embodiment, the CRF model accepts binary features, so several subset gazetteers are created by thresholding the gazetteer entries based on their scores. Each subset gazetteer is then considered a separate feature for the CRF model.

Figure 3:
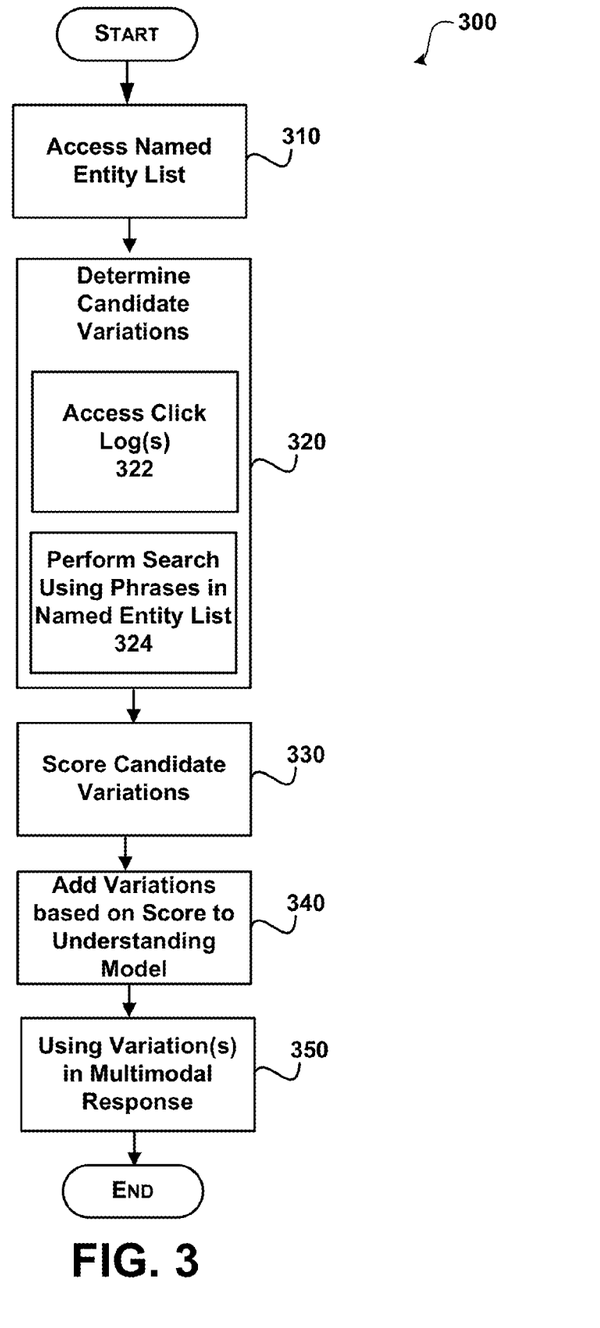
FIG. 3 shows an illustrative process for determining variations for named entities and using the variations in a multimodal system.

FIG. 3 shows an illustrative process 300 for determining variations for named entities and using the variations in a multimodal system. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process moves to operation 310, where a named entity list is accessed. The named entities may be obtained from one or more sources (e.g. databases, web sites, documents, . . . ) and include an initial list of named entities (e.g. person, movie, item, product, song, and the like). According to an embodiment, the named entity list contains a single canonical phrase for each named entity.

Flowing to operation 320, candidate variations are determined for all/portion of the named entities in the named entity list. The candidate variations may be determined using search/click logs 322 as well as searches using the phrases associated with the named entities. Web logs and search results are automatically mined to determine candidate variations. In some instances, seed entities are not observed in search/click logs. To obtain variations for each entity in an entity set, the search engine 130 may be directly scraped with the seed entity as a query to generate search results for the entity and the corresponding set of URLs. According to an embodiment, click logs may be accessed as well as performing a search for all/portion of the phrases in the named entity list.

Moving to operation 330, the determined candidate variations are scored. The scoring is used to assist in determining whether or not to include the variation in an understanding model. According to an embodiment, the score identifies a likelihood ratio that the candidate variation is related to the named entity in the named entity list. A more complete discussion of computing a score may be found in the discussion of FIG. 2.

Transitioning to operation 340, variations are added to an understanding model. According to an embodiment, the score is used in determining what candidate variations to add to the understanding model. For example, variations that exceed a threshold may be added to the understanding model, a predetermined number of variations that exceed a threshold may be added to the understanding model, and the like.

Flowing to operation 350, the variations incorporated into the understanding model are used when receiving input and delivering spoken responses as well as displaying output in a multimodal system. For example, instead of using the named entity in the named entity list, a popular and/or shortened name (e.g. "SNL" for "Saturday Night Live") may be used by the multimodal system.

The process then moves to an end operation and returns to processing other actions.

Figure 4:
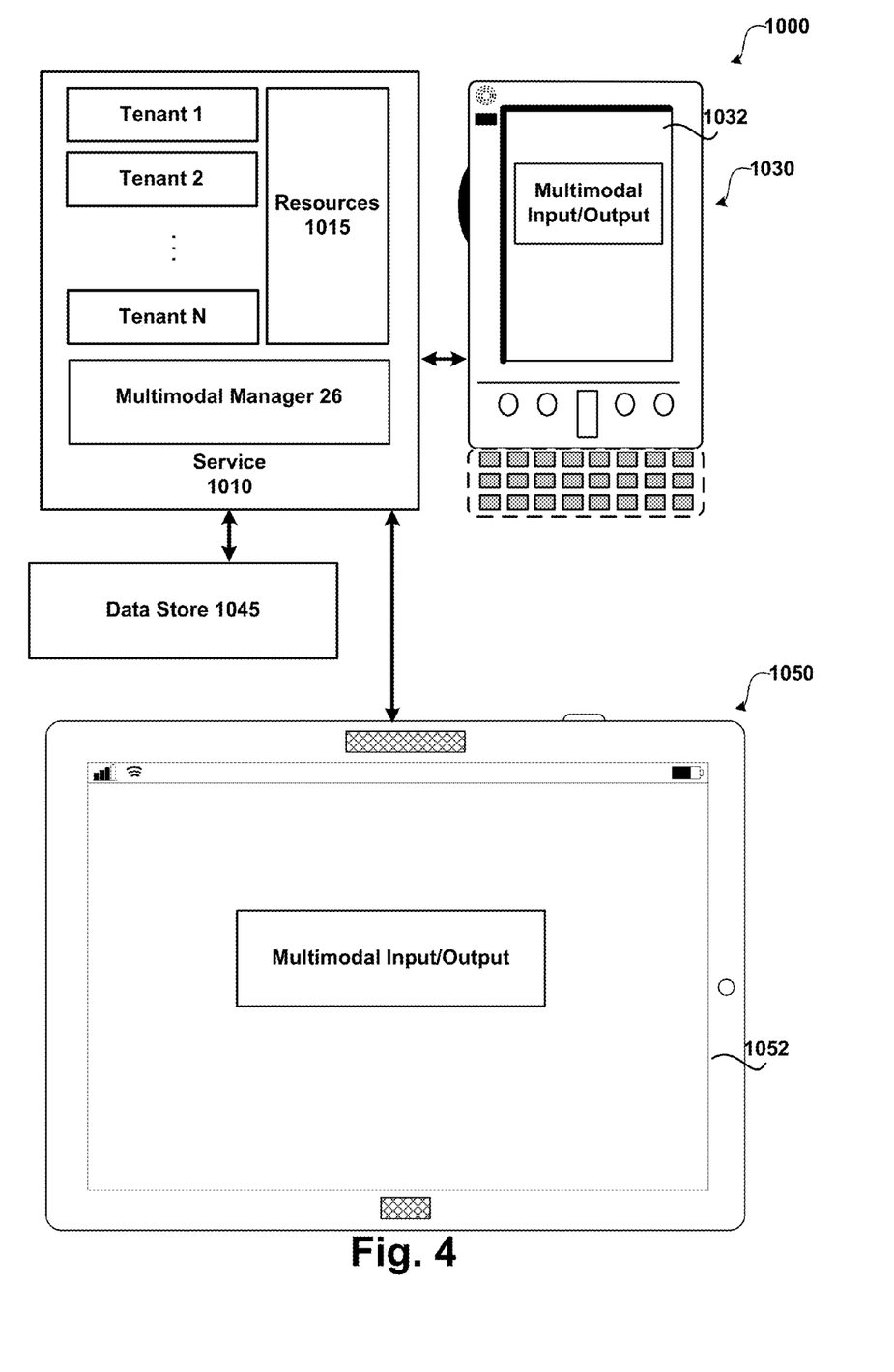
FIG. 4 illustrates an exemplary system for using variations to named entities in a multimodal system.

FIG. 4 illustrates an exemplary system for using variations to named entities in a multimodal system. As illustrated, system 1000 includes service 1010, data store 1045, touch screen input device/display 1050 (e.g. a slate) and smart phone 1030.

As illustrated, service 1010 is a cloud based and/or enterprise based service that may be configured to provide services, such as multimodal services related to various applications (e.g. games, browsing, locating, productivity services (e.g. spreadsheets, documents, presentations, charts, messages, and the like)). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application. Although system 1000 shows a service relating to a multimodal application, other services/applications may be configured to use named lists enhanced with variations determined by multimodal manager 26.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micromachined accelerometers, piezoelectric devices, capacitive sensors, resistive sensors, inductive sensors, laser vibrometers, and LED vibrometers.

According to an embodiment, smart phone 1030 and touch screen input device/display 1050 are configured with multimodal applications.

As illustrated, touch screen input device/display 1050 and smart phone 1030 shows exemplary displays 1052/1032 showing the use of an application and providing multimodal output. Data may be stored on a device (e.g. smart phone 1030, slate 1050 and/or at some other location (e.g. network data store 1045). The applications used by the devices may be client based applications, server based applications, cloud based applications and/or some combination.

Multimodal manager 26 is configured to perform operations relating to determining variations for named entities and using the determined variations as described herein. While manager 26 is shown within service 1010, the functionality of the manager may be included in other locations (e.g. on smart phone 1030 and/or slate device 1050).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
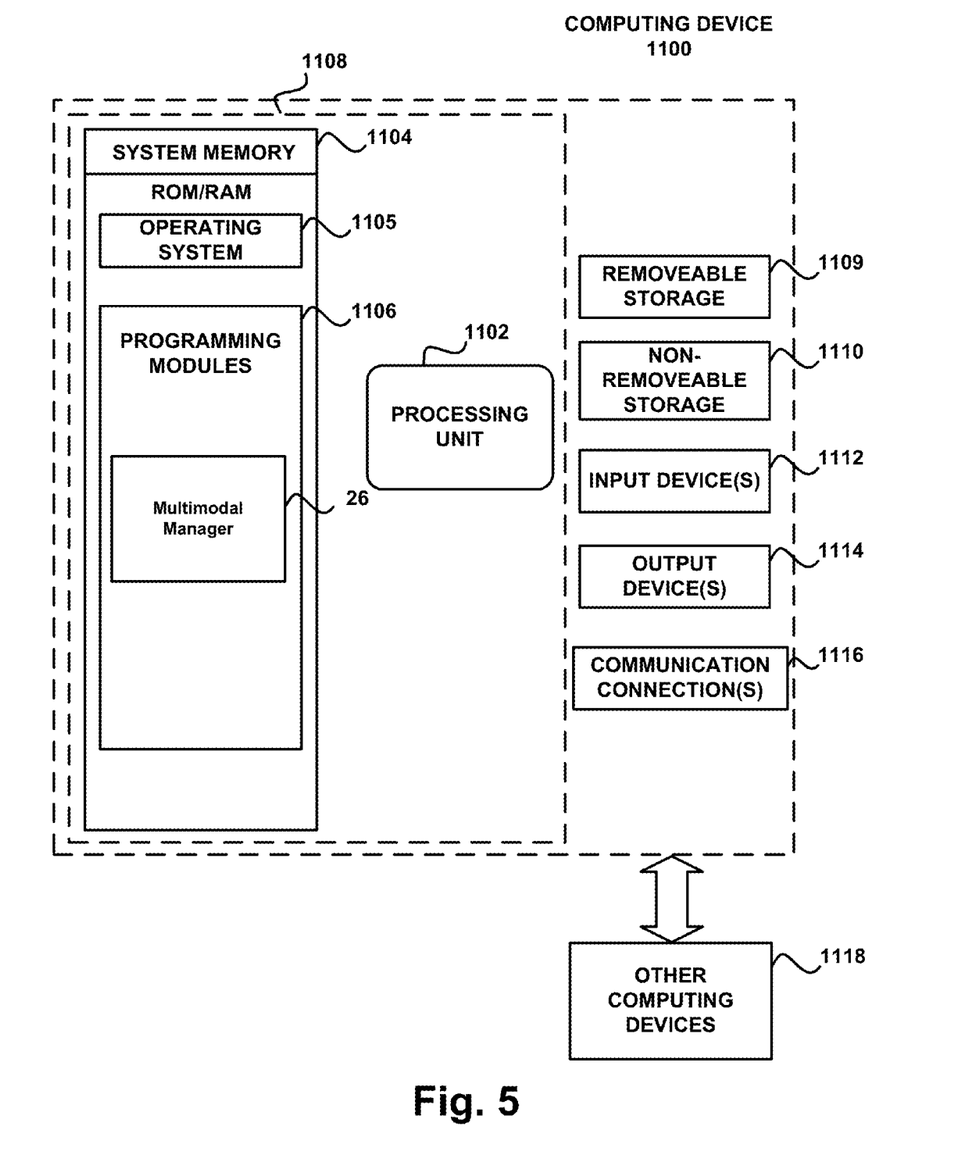
FIGS. 5, 6A, 6B, and 7 and the associated descriptions provide a discussion of a variety of operating environments in which embodiments of the invention may be practiced.
Figure 6A:
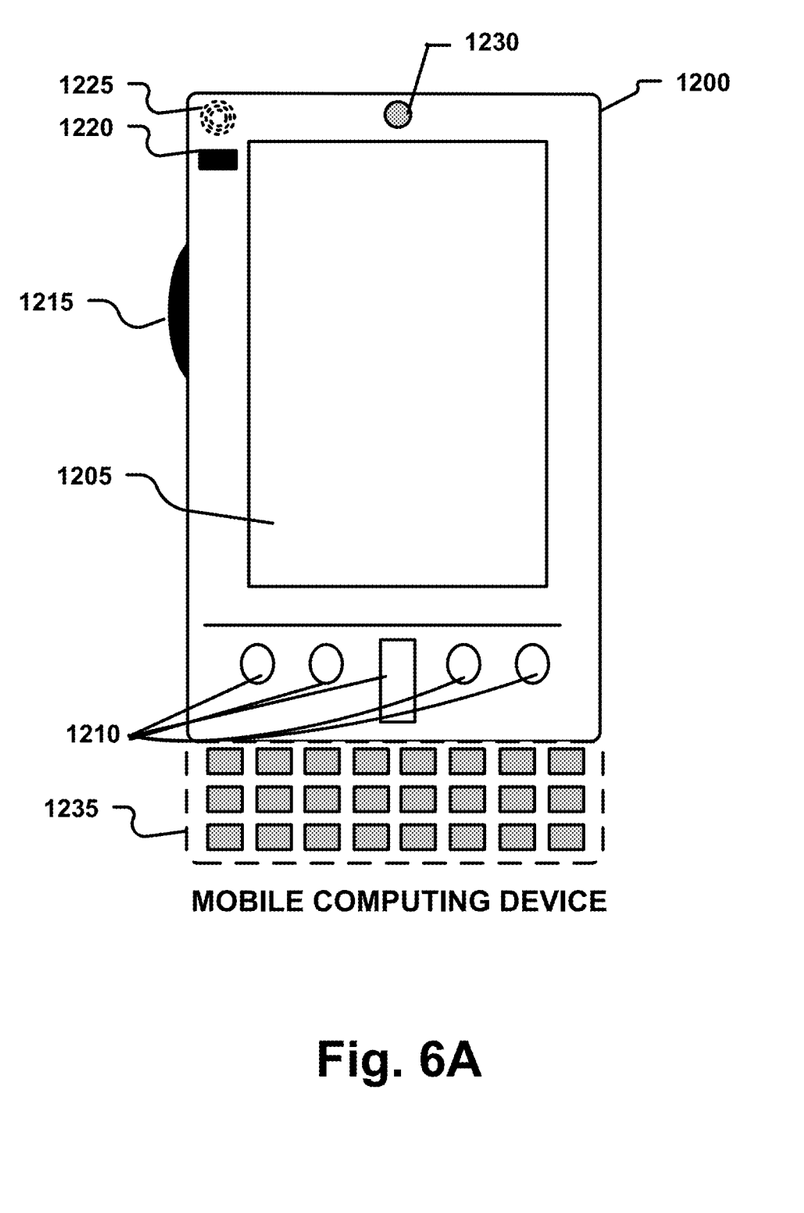
Figure 6B:
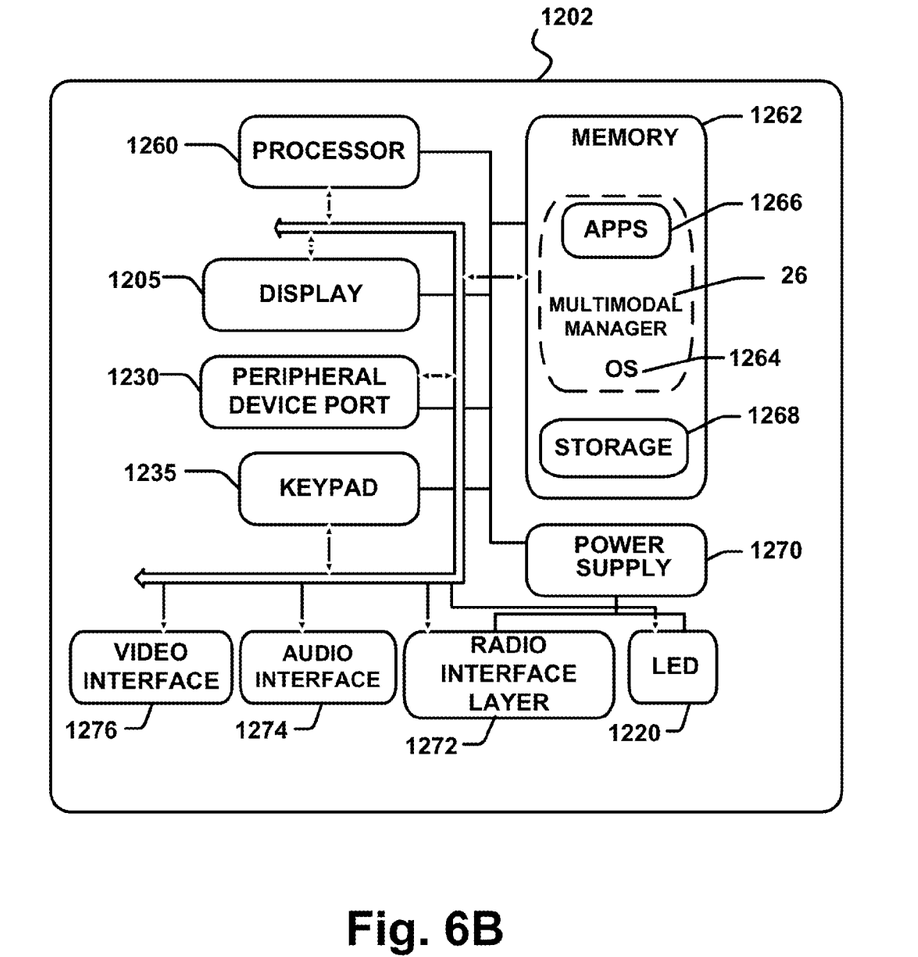
Figure 7:
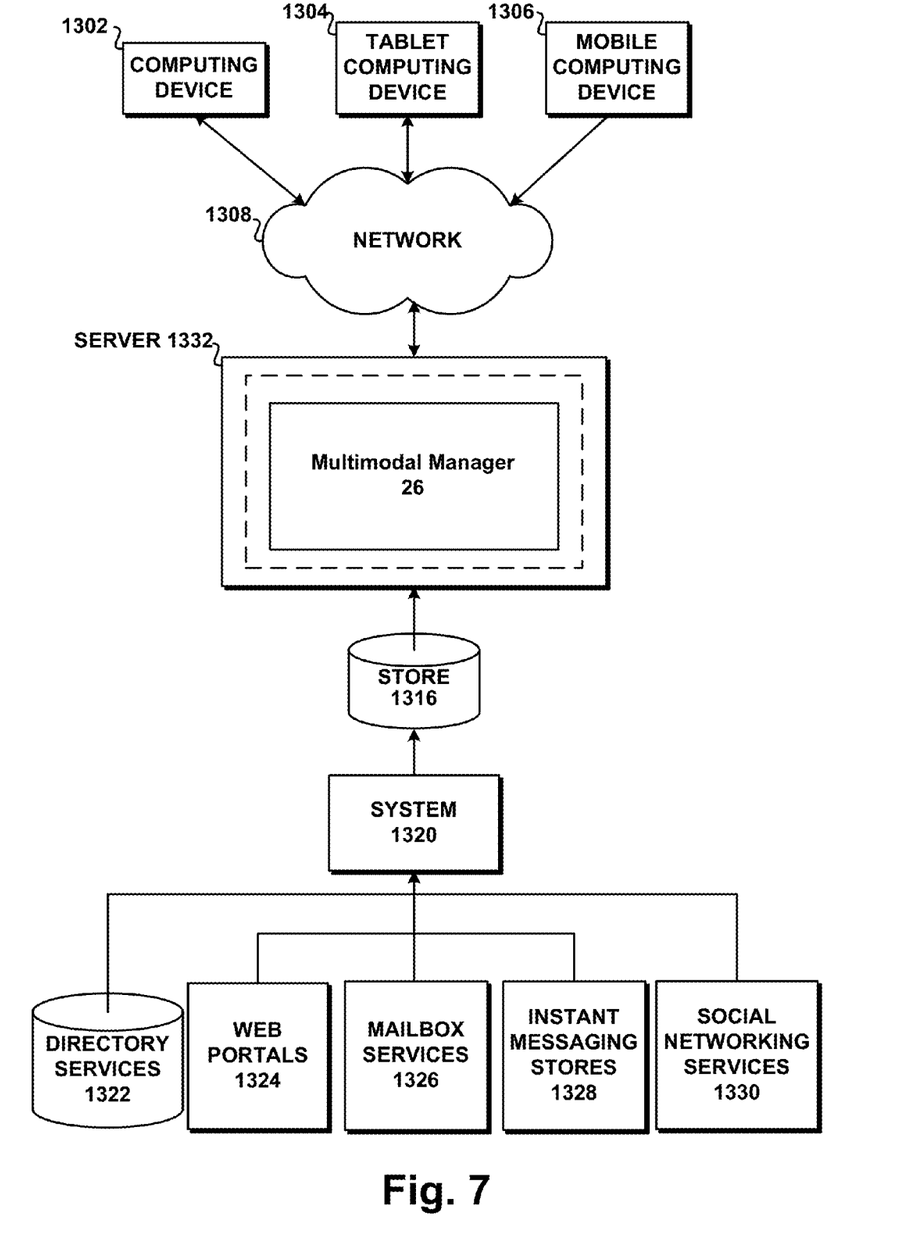

FIGS. 5-7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a multimodal manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 5 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a suitable mobile computing environment, for example, a mobile telephone, a smartphone, a tablet personal computer, a laptop computer, and the like, with which embodiments of the invention may be practiced. With reference to FIG. 6A, an example mobile computing device 1200 for implementing the embodiments is illustrated. In a basic configuration, mobile computing device 1200 is a handheld computer having both input elements and output elements. Input elements may include touch screen display 1205 and input buttons 1215 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1215. Mobile computing device 1200 may also include an optional keypad 1235. Optional keypad 1215 may be a physical keypad or a "soft" keypad generated on the touch screen display.

Mobile computing device 1200 incorporates output elements, such as display 1205, which can display a graphical user interface (GUI). Other output elements include speaker 1225 and LED light 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 6B is a block diagram illustrating components of a mobile computing device used in one embodiment, such as the computing device shown in FIG. 6A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PDA) and wireless phoneme.

One or more application programs 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the multimodal manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application programs 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone 1220 to receive audible input, such as to facilitate a telephone conversation. In accordance with embodiments of the present invention, the microphone 1220 may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 8B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 7 illustrates a system architecture for determining and using variations for named entities.

Components managed via the multimodal manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to using and determining variations. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for determining variations for named entities, comprising:
accessing a named entity list comprising a canonical phrase for an entry in the named entity list;
determining a candidate variation for the canonical phrase, wherein the candidate variation is an alternative phrase for the canonical phrase;
determining, using click log data associated with a seed entity list of entities that are of a same type as the canonical phrase, a set of related websites from a plurality of websites, wherein the set of related websites is determined by mining the click log data to identify links that are most selected for queries corresponding with the seed entity list, wherein the mining of the click data includes determining a ratio of clicks received for a particular website to clicks received for queries in the seed entity list;
obtaining a likelihood ratio for a website in the set of related websites, wherein the likelihood ratio indicates a probability of a click on the particular website in response to a query from the seed entity list versus a probability of click on the particular website in response to a random query;
generating a score for the candidate variation based on evaluation of a distribution of click data for the candidate variation, wherein the score for the candidate variation is a weighted click vote over the web sites clicked for the candidate variation and is generated as a sum over all websites clicked in response to a query comprising the candidate variation, where each website is weighted by the likelihood ratio pertaining to the particular website;
determining whether to include the candidate variation in a language understanding model based on the score; and
training the language understanding model by updating the named entity list to include the candidate variation for the canonical phrase based on the score.

2. The method of claim 1, wherein determining of the candidate variation comprises performing a search of the canonical phrase using a search engine.

3. The method of claim 1, further comprising:
using the updated named entity list to process a received query.

4. The method of claim 3, wherein the using further comprises outputting the candidate variation from the named entity list in a response to a user.

5. The method of claim 4, wherein the using further comprises replacing the canonical phrase received in the query with at least one candidate variation.

6. The method of claim 1, wherein determining the candidate variation for the canonical phrase further comprises one or more of: evaluation of click log data to determine a distribution of clicks between different websites and scraping search logs of a search engine.

7. The method of claim 1, wherein the score is a value determined from cross entropy processing of the distribution of click data.

8. The method of claim 1, wherein the score is generated by processing that compares the distribution of click data for the candidate variation with a distribution of click data for the set of related websites.

9. The method of claim 1, wherein determining the candidate variation to include in the language understanding model comprises determining whether a score of the candidate variation is above a threshold, and the training of the language understanding model further comprises updating the named entity list to include the candidate variation in response to determining the score for the candidate variation is above the threshold.

10. A computer-readable storage device storing computer-executable instructions that, when executed by a processor, causes the processor to execute a method comprising:
   accessing a named entity list comprising a canonical phrase for an entry in the named entity list;
   determining one or more candidate variations for the canonical phrase, wherein a candidate variation is an alternative phrase for the canonical phrase;
   determining, using click log data associated with a seed entity list of entities that are of a same type as the canonical phrase, a set of related websites from a plurality of websites, wherein the set of related websites is determined by mining the click log data to identify links that are most selected for queries corresponding with the seed entity list, wherein the mining of the click data includes determining a ratio of clicks received for a particular website to clicks received for queries in the seed entity list;
   obtaining a likelihood ratio for each website in the set of related websites, wherein the likelihood ratio indicates a probability of a click on the particular website in response to a query from the seed entity list versus a probability of click on the particular website in response to a random query;
   generating a score for the one or more candidate variations based on evaluation of a distribution of click data for the one or more candidate variations, wherein the score for each of the one or more candidate variations is a weighted click vote over the web sites clicked for the one or more candidate variations and is generated as a sum over all websites clicked in response to a query comprising the one or more candidate variations, where each website is weighted by the likelihood ratio pertaining to the particular website;
   updating the named entity list to include the one or more of the candidate variations for the canonical phrase within the named entity list based on the score; and
   training a language understanding model by updating the named entity list to include the candidate variation for the canonical phrase based on the score.

11. The computer-readable storage device of claim 10, wherein determining the one or more candidate variations comprises performing a search with at least one of the canonical phrases and obtaining results used to determine the candidate variations.

12. The computer-readable storage device of claim 10, wherein determining the one or more candidate variations comprises accessing search data to determine a scoring for the one or more candidate variations.

13. The computer-readable storage device of claim 10, wherein the using of the one or more candidate variations in an interaction with the user further comprises outputting the one or more candidate variations from the named entity list.

14. The computer-readable storage device of claim 10, wherein determining the one or more candidate variations further comprises one or more of: evaluation of click log data to determine a distribution of clicks between different websites and scraping search logs of a search engine.

15. The computer-readable storage device of claim 10,
   wherein the method further comprises using the one or more candidate variations in an interaction with a user, and
   wherein the using of the one or more candidate variations in an interaction with a user further comprises replacing the canonical phrase with at least one of the candidate variations.

16. The computer-readable storage device of claim 10, wherein the score is a value determined from cross entropy processing of the distribution of click data.

17. A system for determining variations for named entities, comprising:
   a processor and memory;
   an operating environment executing using the processor; and
   a display, wherein the processor is configured to perform actions comprising: accessing a named entity list comprising a canonical phrase for at least one entry in the named entity list;
   determining one or more candidate variations for the canonical phrase, wherein a candidate variation is an alternative phrase for the canonical phrase;
   determining, using click log data associated with a seed entity list of entities that are of a same type as the canonical phrase, a set of related websites from a plurality of websites, wherein the set of related websites is determined by mining the click log data to identify links that are most selected for queries corresponding with the seed entity list, wherein the mining of the click data includes determining a ratio of clicks received for a particular website to clicks received for queries in the seed entity list;
   obtaining a likelihood ratio for a website in the set of related websites, wherein the likelihood ratio indicates a probability of a click on the particular website in response to a query from the seed entity list versus a probability of click on the particular website in response to a random query;
   generating a score for the one or more candidate variations based on evaluation of a distribution of click data for the candidate variation, wherein the score for the one or more candidate variation is a weighted click vote over the web sites clicked for the one or more candidate variations and is generated as a sum over all websites clicked in response to a query comprising the one or more candidate variations, where each website is weighted by the likelihood ratio pertaining to the particular web site;

determining at least one candidate variation to include in a language understanding model using the score for the one or more candidate variations;

training the language understanding model to include one or more of the candidate variations within the named entity list based on the determined candidate variations; and providing the trained language model as a resource in a distributed service.

18. The system of claim 17, wherein the providing further comprises outputting at least one of the candidate variations from the named entity list in response to a received query.

19. The system of claim 17, wherein the providing further comprises replacing the canonical phrase with at least one of the candidate variations in an interaction with a user.

20. The system of claim 17, wherein the score is generated by processing that compares the distribution of click data for the candidate variation with a distribution of click data for the set of related websites.

* * * * *